US005949974A

United States Patent [19]

Ewing et al.

[11] Patent Number: 5,949,974
[45] Date of Patent: Sep. 7, 1999

[54] SYSTEM FOR READING THE STATUS AND FOR CONTROLLING THE POWER SUPPLIES OF APPLIANCES CONNECTED TO COMPUTER NETWORKS

[76] Inventors: Carrell W. Ewing, 585 Washington, Palo Alto, Calif. 94301; Andrew J. Cleveland, 12467 Creek View Ct., San Martin, Calif. 95046

[21] Appl. No.: 08/685,436

[22] Filed: Jul. 23, 1996

[51] Int. Cl.[6] .............................. G06F 15/16; G06F 1/26
[52] U.S. Cl. ........................... 395/200.32; 395/200.53; 395/750.08
[58] Field of Search .................................. 340/644, 646, 340/310.01, 825.5; 395/200.32, 200.53, 200.54

[56] References Cited

U.S. PATENT DOCUMENTS

| | | | |
|---|---|---|---|
| 4,101,878 | 7/1978 | Shimizu et al. | 340/310.01 |
| 4,495,568 | 1/1985 | Gilbert et al. | 395/182.2 |
| 4,709,318 | 11/1987 | Gephart et al. | 363/37 |
| 4,780,714 | 10/1988 | Moustakas et al. | 340/825.5 |
| 4,937,561 | 6/1990 | Sasaki et al. | 340/646 |
| 5,374,922 | 12/1994 | Ebersohl | 340/644 |
| 5,412,645 | 5/1995 | Younkin et al. | 370/365 |
| 5,481,730 | 1/1996 | Brown et al. | 395/750.08 |
| 5,485,576 | 1/1996 | Fee et al. | 395/185.09 |
| 5,495,607 | 2/1996 | Pisello et al. | 707/10 |
| 5,506,573 | 4/1996 | Ewing et al. | 340/644 |
| 5,561,769 | 10/1996 | Kumar et al. | 395/200.32 |
| 5,585,678 | 12/1996 | Dijk et al. | 307/112 |
| 5,652,893 | 7/1997 | Ben-Meir et al. | 395/750.02 |
| 5,761,084 | 6/1998 | Edwards | 364/528.28 |
| 5,781,434 | 7/1998 | Tobita et al. | 364/184 |

OTHER PUBLICATIONS

W. Richard Stevens, "TCP/IP Illustrated, vol. 1 —The Protocols", pp. 359–361, 1994.
Michael Slater, "Microprocessor–Based Design—A Comprehensive Guide to Hardware Design", pp. 19–24, 1989.
Peter Drake, "Using SNMP to Manage Networks", pp. 2/1–2/4, 1991.

*Primary Examiner*—Zarni Maung
*Assistant Examiner*—Andrew Caldwell
*Attorney, Agent, or Firm*—Richard B. Main

[57] ABSTRACT

A SNMP network comprises a power manager with a SNMP agent in TCP/IP communication over a network with a SNMP network manager. The power manager is connected to control several intelligent power modules each able to independently control the on/off power to several inter-networking devices in an equipment rack at a common remote node, e.g., a point-of-presence site. Power-on and load sensors within each intelligent power module are able to report the power status of each inter-networking device to the SNMP network manager with MIB variables in response to GET commands. The SNMP network manager is further able to reboot each inter-networking device by cycling the power on/off to its respective intelligent power module with the SET command provided in conventional SNMP management applications.

12 Claims, 4 Drawing Sheets

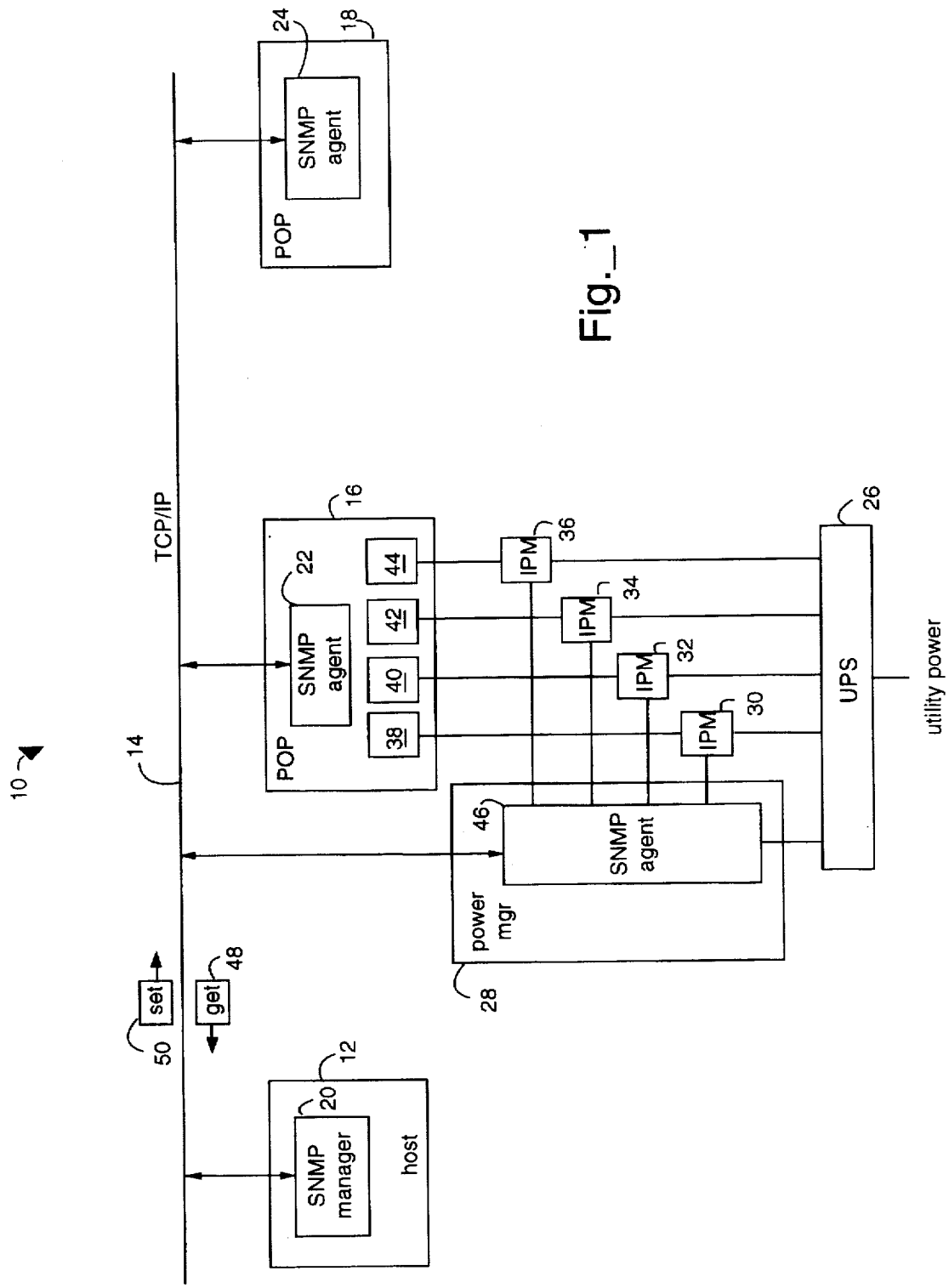
Fig._1

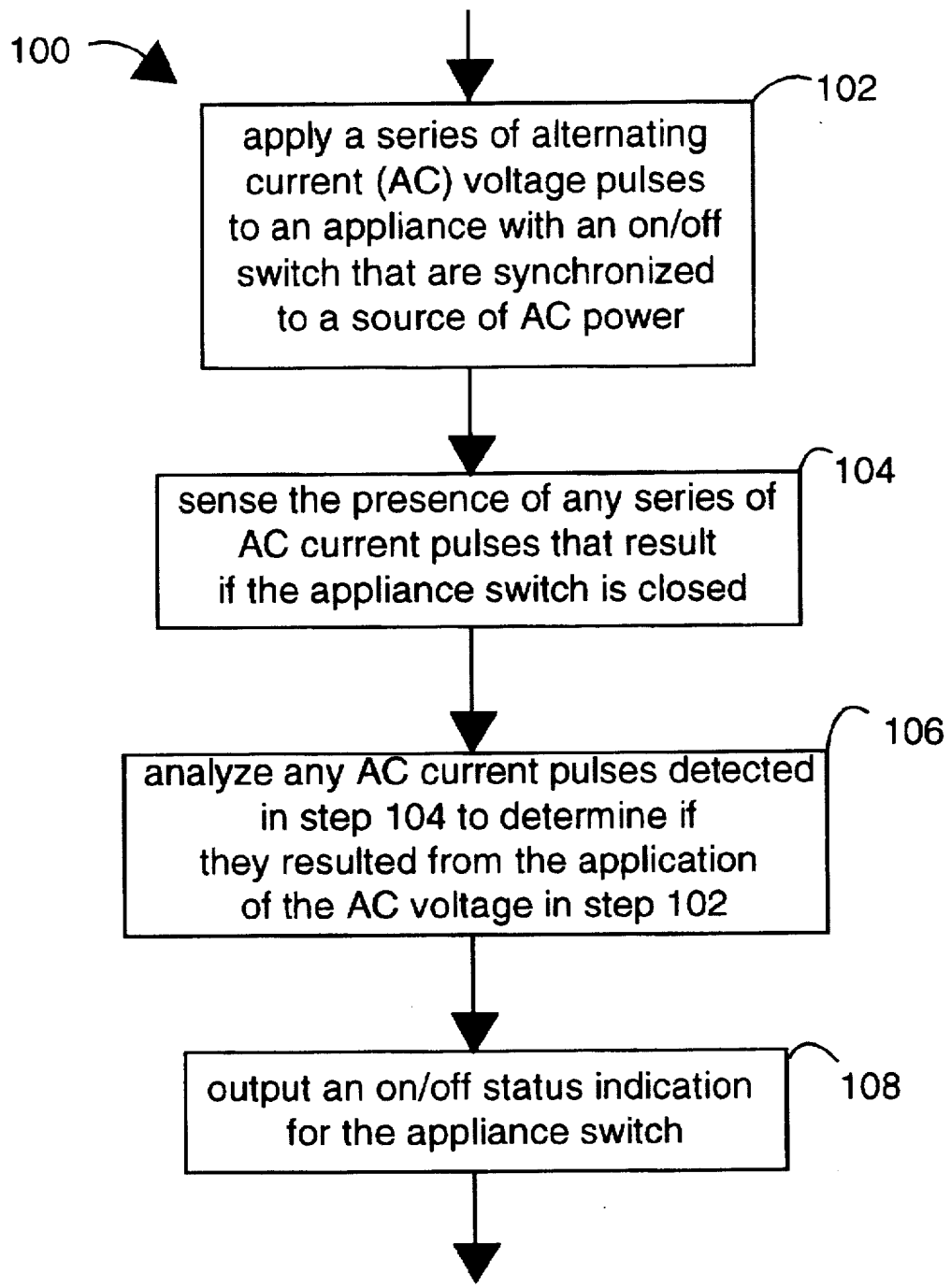
Fig._2

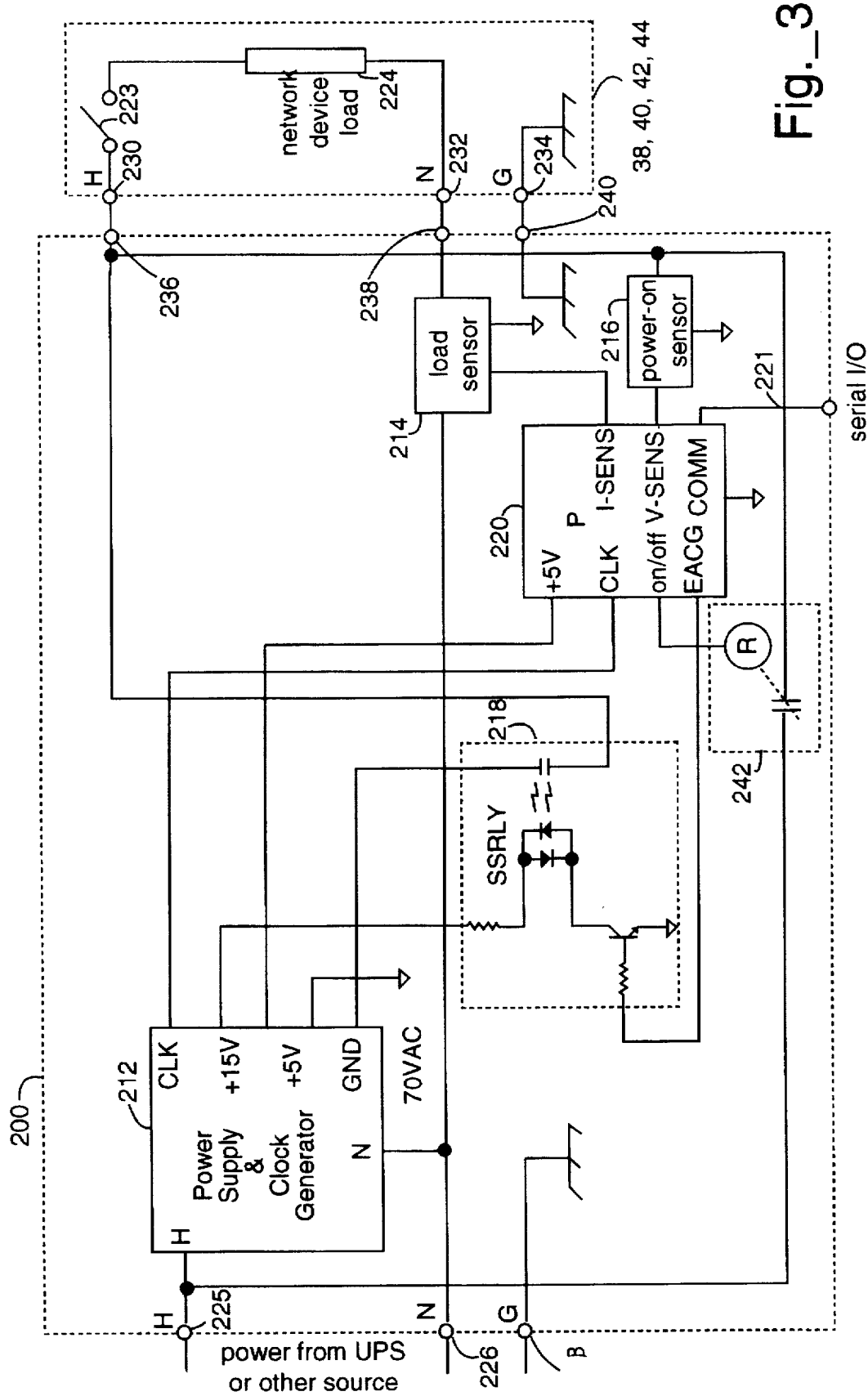
Fig._3

Fig._4
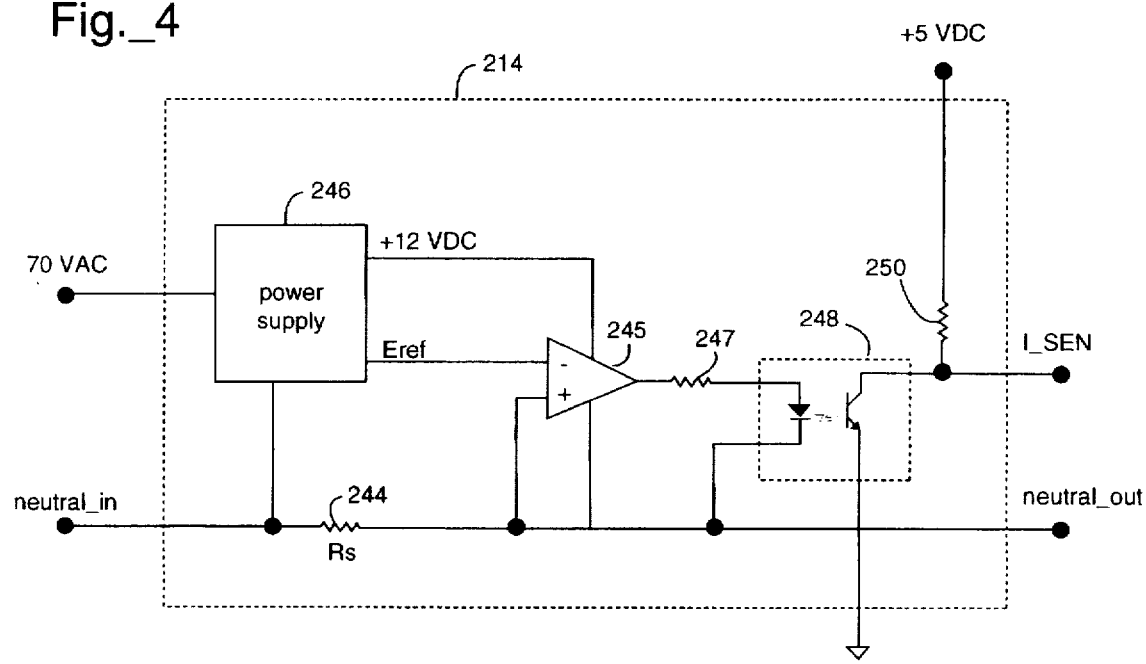
Fig._5
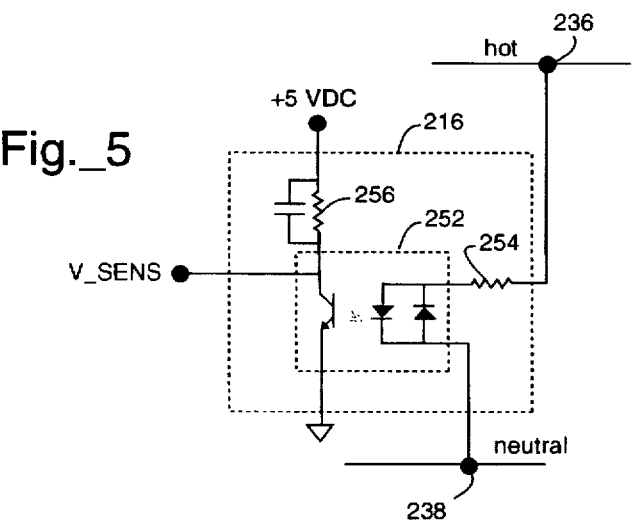

SYSTEM FOR READING THE STATUS AND FOR CONTROLLING THE POWER SUPPLIES OF APPLIANCES CONNECTED TO COMPUTER NETWORKS

BACKGROUND OF THE INVENTION

1. Field of the Invention

The invention relates generally to automatic power control and more particularly to remote control methods and devices to maintain computer network system availability.

2. Description of the Prior Art

Enterprise networks exist to support large world-wide organizations and depend on a combination of technologies, e.g., data communications, inter-networking equipment (frame relay controllers, asynchronous transfer mode (ATM) switches, routers, integrated services digital network (ISDN) controllers, application servers), and network management application software. Such enterprise networks can be used to support a large company's branch offices throughout the world, and, as such, these networks have become mission critical to the functioning of such organizations. Masses of information are routinely expected to be exchanged, and such information exchanges are necessary to carry on the daily business of modern organizations. For example, some international banks have thousands of branch offices placed throughout Europe, Asia and the United States that each critically depend on their ability to communicate banking transactions quickly and efficiently with one another and headquarters.

A typical enterprise network uses building blocks of router and frame relay inter-networking devices mounted in equipment racks. Such equipment racks are distributed to remote point of presence (POP) locations in the particular network. Each equipment rack can include frame relay controllers, routers, ISDN controllers, servers and modems, etc., each of which are connected to one or more power sources. The value of POP equipment can range from $200,000 to $500,000, and the number of individual devices can exceed a thousand.

Many enterprises rely on an uninterruptable power supply (UPS) to keep their inter-networking devices operational. Many inter-networking devices are typically connected to a single UPS, and this sets up a problem. When an individual router locks up, the router's power cannot be individually cycled on and off externally at the UPS because it is connected to a multiple power outlet. The recovery action choices available to the network control center operator thus do not include being able to reinitialize the individual equipment through a power interruption reset. The network operator could command the UPS to power cycle, but that would reset all the other attached devices that were ostensibly operating normally and carrying other network traffic. Another option is to dispatch someone to the remote location to reset the locked-up device. Neither choice is an attractive solution.

In large organizations that have come to depend heavily on enterprise networks, great pressures develop to control costs and thus to improve profits. Organizational downsizing has been used throughout the corporate world to reduce non-network costs, and that usually translates to fewer technical people available in the right places to support large and complex in-house global networks. Such reduced repair staffs now rely on a combination of centralized network management tools and third-party maintenance organizations to service their remote POP sites. The costs associated with dispatching third-party maintenance technicians is very high, and the dispatch and travel delay times can humble the business operations over a wide area for what seems an eternity.

Global communication network operators, located at a few centralized network management centers, are relying more and more on automated network management applications to analyze, process, display and support their networks. An increasing number of network management software applications are being marketed that use open-system standardized protocols. Particular network application tool software is available to report lists of the inter-networking devices, by location, and can issue trouble lists and keep track of software versions and releases. New simple network management protocol (SNMP) applications are conventionally used to issue alarms to central management consoles when remote inter-networking devices fail.

One such SNMP network management application is marketed by Hewlett-Packard. HP OPENVIEW is a family of network and system management tools and services for local and wide area multivendor networks. OPENVIEW is a management platform that provides application developers and users with the ability to manage multivendor networks and expand their distributed computing environments. OPENVIEW allows network operation centers to build an intelligent hierarchical network management application, and uses open standards such as SNMP, user datagram protocol (UDP), and the now ubiquitous transmission control protocol/internet protocol (TCP/IP). Because OPENVIEW is built on open system standards, global communication network operators can easily integrate the various inter-networking equipment nodes into a managed environment operated by strategically located network consoles.

In order to provide a reliable computing environment, a robust and active process for problem resolution must be in place. OPENVIEW allows the definition of thresholds and monitoring intervals, and the interception of network, system, database, and application-messages and alerts. Once a threshold value is exceeded, intelligent agents can run a pre-defined automatic action and/or generate and send a message to alert an operator on a central management console. Messages can also be forwarded to a pager or trouble-ticketing application. To help focus on the most critical problems, a message browser window is used to display six severity levels for incoming problems and events, e.g., ranging from stable to critical. An integrated history database is provided for auditing and analyzing system and network activities, for identifying trends and for anticipating problems before they occur. Activity displays and reports can be customized by the users.

Prior art SNMP network management uses embedded microprocessors in almost every inter-networking device to support two-way inter-computer communications with TCP/IP, of which SNMP is a member of the TCP/IP protocol suite. SNMP is conventionally used to send messages between management client nodes and agent nodes. Management information blocks (MIBs) are used for statistic counters, port status, and other information about routers and other network devices. GET and SET commands are issued from management consoles and operate on particular MIB variables for the equipment nodes. Such commands allow network management functions to be carried out between client equipment nodes and management agent nodes.

SNMP is an application protocol for network management services in the internet protocol suite. SNMP has been adopted by numerous network equipment vendors as their main or secondary management interface. SNMP defines a client/server relationship, wherein the client program, a "network manager", makes virtual connections to a server program, an "SNMP agent", on a remote network device. The data base controlled by the SNMP agent is the SNMP management information base, and is a standard set of statistical and control values. SNMP and private MIBs allow the extension of standard values with values specific to a particular agent. Directives issued by the network manager client to an SNMP agent comprise SNMP variable identifiers, e.g., MIB object identifiers or MIB variables, and instructions to either GET the value for the identifier, or SET the identifier to a new value. Thus private MIB variables allow SNMP agents to be customized for specific devices, e.g., network bridges, gateways, and routers. The definitions of MIB variables being supported by particular agents are located in descriptor files, typically written in abstract syntax notation (ASN.1) format. The definitions are available to network management client programs.

SNMP enjoys widespread popularity, and SNMP agents are available for network devices including computers, bridges, modems, and printers. Such universal support promotes interoperability. The SNMP management protocol is flexible and extensible. SNMP agents can incorporate device specific data. Mechanisms such as ASN.1 files allow the upgrading of network management client programs to interface with special agent capabilities. Thus SNMP can take on numerous jobs specific to device classes such as printers, routers, and bridges. A standard mechanism of network control and monitoring is thus possible.

Unfortunately, SNMP is a complicated protocol to implement, due to complex encoding rules, and it is not a particularly efficient protocol. Bandwidth is often wasted with needless information, such as the SNMP version that is to be transmitted in every SNMP message, and multiple length and data descriptors scattered throughout each message. SNMP variables are identified as byte strings, where each byte corresponds to a particular node in the MIB database. Such identification leads to needlessly large data handles that can consume substantial parts of each SNMP message.

Most vendors implement network managers thinking a user's primary interest is in the data associated with particular network devices. But such data is easily acquired by other means, e.g., "netstat" and "rsh" UNIX programs. The important information about the network includes the differences between devices, besides their current states. SNMP affords a good mechanism for rapidly processing such differences on large networks, since SNMP avoids the processing burden of remote login and execution.

Network management applications can thus monitor the health of every part of a global communications network and can be set to communicate alarms to a central management console. Current network management applications do an adequate job of informing central management consoles about the health of various nodes in the network and the alarms they issue when a node is failing are useful.

Conventional SNMP network management technologies do not provide sufficient information related to the nodes' electrical power status. A new technology is needed that can be simply and inexpensively added to client equipment nodes for SNMP reporting of the electrical power status of the node. For example, in a router based network with SNMP support, prior art individual routers can use SNMP to issue an alarm to the management console. But the console operator would know only that the router is failing. A GET command can be issued to the router node to determine if the counter and buffer thresholds limits were exceeded and caused a router to lock-up. However, the console operator does not have any information about the electrical power status to the router, e.g., has the router power switch been moved to the OFF position or has the switch been accidentally turned OFF? The electrical power source could have failed, the power cable connection become loose, or a technician may have accidentally removed the router from a rack.

SUMMARY OF THE PRESENT INVENTION

It is therefore an object of the present invention to provide a system and method for providing power supply status and control in network nodes at geographically distant locations.

It is another object of the present invention to provide a system and method for describing power supply status and control in SNMP MIB variables between network nodes and a central network management console.

Briefly, an SNMP network embodiment of the present invention comprises a power manager with an SNMP agent in TCP/IP communication over a network with an SNMP network manager. The power manager is connected to control several intelligent power modules each able to independently control the power on/off status of several inter-networking devices in an equipment rack at a common remote node, e.g., a point-of-presence site. Power-on and load sensors within each intelligent power module are able to report the power status of each inter-networking device to the SNMP network manager with MIB variables in response to GET commands. The SNMP network manager is further able to reboot each inter-networking device by cycling the power off/on to its respective intelligent power module with the SET command provided in conventional SNMP management applications.

An advantage of the present invention is that a system and method is provided for communicating and controlling the power supply status of network nodes at geographically distant locations.

Another advantage of the present invention is that a system and method is provided for describing power supply status and control in SNMP MIB variables between network nodes and a central network management console.

A further advantage of the present invention is that a system and method is provided that allows a network console operator to investigate the functionality of the electrical power status when a router or other network device has been detected as failing.

A still further advantage of the present invention is that a system and method is provided for reducing the need for enterprise network operators to dispatch third party maintenance vendors to remote equipment rooms and POP locations simply to power-cycle failed inter-networking devices. The costs to dispatch such third party maintenance vendor can run from $300–$600 per call. The cost of implementing the present invention can be recaptured in less than one year, e.g., by reducing the number of third party maintenance dispatches to remote locations.

Another advantage of the present invention is that a system and method is provided for reducing the time it takes to restore a failed inter-networking device and improving service level measures.

Another advantage of the present invention is that a system and method is provided for reducing organization losses from network downtime. Being able to immediately power-cycle a failed server and thus return the server to operation can directly reduce the downtime loss to the organization.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a simple network management protocol (SNMP) network embodiment of the present invention;

FIG. 2 is a flowchart of a method of appliance power switch status detection, according to the present invention;

FIG. 3 is a schematic of a representative intelligent power module such as are included in the network of FIG. 1;

FIG. 4 is a schematic diagram of the load sensor included in the intelligent power module of FIG. 3; and FIG. 5 is a schematic diagram of the power-on sensor included in the intelligent power module of FIG. 3.

DETAILED DESCRIPTION OF THE PREFERRED EMBODIMENTS

FIG. 1 illustrates a simple network management protocol (SNMP) network embodiment of the present invention, referred to herein by the general reference numeral 10. The SNMP network 10 includes a host 12 with a TCP/IP connection 14 to a plurality of point-of-presence (POP) nodes represented by a pair of equipment racks 16 and 18. SNMP network management is provided by a SNMP manager 20 in communication with a respective pair of SNMP agents 22 and 24 at the remote nodes. The SNMP manager 20 may comprise a commercial product such as IBM NETVIEW/ 6000, HP OPENVIEW, POLYCENTER, SunNet MANAGER, Cabletron SPECTRUM, etc.

Each POP node can be associated with an uninterruptable power supply (UPS) 26 that provides operating power to a TCP/IP-addressable enterprise power manager 28 and several intelligent power modules 30, 32, 34, 36 connected to corresponding inter-networking devices 38, 40, 42, 44. An SNMP agent 46 is private to the power manager 28 and does not depend on the equipment rack 16 or its inter-networking devices 38, 40, 42, 44. The power manager 28 is connected to independently control each of the intelligent power modules 30, 32, 34, 36. Such control includes being able to sense the power-on and load status of each of the inter-networking devices 38, 40, 42, 44 and to switch power on and off to each of the inter-networking devices 38, 40, 42, 44. Such status is sensed and reported by an SNMP GET command 48 and the power switching is accomplished with an SNMP SET command 50 that issue from the host 12.

FIG. 2 shows a method of appliance power switch status detection, referred to herein by the general reference numeral 100. The method 100 comprises a step 102 applying a series of alternating current (AC) voltage pulses to an appliance with an on/off switch that are synchronized to a source of AC power. A step 104 senses the presence of any series of AC current pulses that result if the appliance switch is closed. A step 106 analyzes any AC current pulses detected in step 104 to determine if they resulted from the application of the AC voltage in step 102. A step 108 outputs an on/off status indication for the appliance switch. Method 100 does not result in the turning-on and the operation of the appliance during steps 102 or 104, and is therefore unobtrusive.

FIG. 3 illustrates an intelligent power module 200, similar to intelligent power modules 30, 32, 34, 36, which may be located external or internal to devices 38, 40, 42, 44, or internal or external to the UPS 26. The intelligent power module 200 includes a power supply and clock generator 212, a load sensor 214, a power-on sensor 216, a solid-state relay 218 and a microprocessor 220. A serial input/output (I/O) connection 221 provides for communication with a controller, e.g., power manager 28. An appliance, such as the inter-networking devices 38, 40, 42, 44, has a power on/off switch 223 that may be internal or external to the appliance represented by a network device load 224. The switch 223 may also actually comprise both internal and external switches in series. The incoming alternating current (AC) line power is applied to the intelligent power module 200 at a hot (H) terminal 225, a neutral (N) terminal 226 and a ground (G) terminal 228. The appliance has its incoming AC line power applied to a hot (H) terminal 230, a neutral (N) terminal 232 and a ground (G) terminal 234, which are respectively connected to a hot (H) terminal 236, a neutral (N) terminal 238 and a ground (G) terminal 240. A relay 242 allows automatic remote control by the microprocessor of power to the appliance due to its position in the incoming AC line.

The load sensor 214 is such that if a current is flowing because switch 223 is closed, the microprocessor will receive a logic low status indication.

FIG. 4 represents an embodiment of the load sensor 214 included in FIG. 3. The load sensor 214 comprises a sense resistor 244 connected to a voltage comparator 245. When the voltage dropped across the sense resistor 244 exceeds a reference voltage provided by a power supply 246, the output of the voltage comparator 245 goes high. A resistor 247 couples this to an opto-isolator 248 and produces a five volt digital output (I_SENS) that indicates load/no-load to the microprocessor 220.

FIG. 5 represents an embodiment of the power-on sensor 216 included in FIG. 3. The power-on sensor 216 includes an opto-isolator 252. The output of the opto-isolator 252 goes low when a sufficient voltage is dropped across a resistor 254. A five volt power supply connection and a pull-up 256 provide a five volt logic output (V_SENS) that indicates power/no-power to the microprocessor 220.

In operation, the device 200 senses if switch 223 is closed or open by converting AC current pulses from the power supply 212 that flow through the series circuit comprising the solid-state relay 218, the H-terminals 236 and 230, the switch 223, the network device load, the N-terminals 232 and 238, the load sensor 214, and return to the power supply 212. If the switch 223 is open, no such current can flow.

The power supply and clock generator 212 provides a five volt pulse clock (CLK) to the microprocessor 220 at each zero-crossing of the incoming AC power line voltage across the H-terminal 225 and the N-terminal 226. A slightly delayed version of the clock is output by the microprocessor 220 to control the solid-state relay 218. A seventy volt AC output (70VAC) of the power supply and clock generator 212 provides a reduced voltage AC sine wave that is approximately seventy volts RMS. The solid-state relay 218 therefore gates through the seventy volt AC waveform twice each cycle such that alternating pulses of +70 volts and −70 volts are sent through switch 223 and load sensor 214. If a current flows because the switch 223 is closed, a characteristic pulse synchronized to the CLK signal will appear as an output from the opto-isolator 248. A resistor 250 provides a pull-up to a current sense input to the microprocessor 220.

If the switch 223 is open, the characteristic pulses will not appear. An "onsense" device 252 provides isolation for a voltage sense input to the microprocessor 220.

The microprocessor 220 analyzes and stores its determination of whether the power is applied to the device 38–44 and whether the switch 223 is closed. Such data is thereafter useful to control the relay 242. The microprocessor 220 is programmed to control the relay 242 and to report the presence of current and voltage to the appliance through serial communication conducted over the serial I/O connection 221.

The power manager 28 is able to read from the intelligent power modules 30, 32, 34, 36, whether there is a proper operating voltage being supplied to the inter-networking devices 38, 40, 42, 44, and whether such loads are turned on. The power manager 28 and its SNMP agent 46 are able to report such status in response to the GET command 48. The GET command modifies a MIB variable that is reported by the SNMP agent 46 to the SNMP manager 20.

The power manager 28 is able to require the intelligent power modules 30, 32, 34, 36, to turn the power being supplied to the inter-networking devices 38, 40, 42, 44, on or off in response to the SET command 50. Such SET commands modify the MIB variable defined for power on/off, and allow independent power-cycling of each and any of the inter-networking devices 38, 40, 42, 44. Such power cycling promotes a power-up reset of the appliance, e.g., when the SNMP agent 22 has reported a failure of the POP node 16 to the SNMP manager 20.

SNMP defines a client/server relationship. The client program, network manager 20, makes virtual connections to the server program, the SNMP agent 22 and 24 on a remote network device. The database controlled by the SNMP agent is the management information base (MIB). The MIB is a standard set of statistical and control values that provides information about the attributes of devices attached to the network. SNMP allows for the extension of these standard values with values that are specific to a particular SNMP agent through the use of private MIBs. The use of private MIB variables allows SNMP agents to be modified for a variety of devices, e.g., bridges, hubs, routers and CSU/DSUs, etc. SNMP operates by exchanging network information through protocol data unit (PDU) messages. PDUs carry variables that have both titles and values. There are five types of PDUs that SNMP uses to monitor a network, two for reading terminal data, two for setting terminal data, and one, the trap, monitoring network events. Every SNMP message consists of a variable, and every variable consists of a variable title, the integer, string data type of the variable, whether the variable is read-only or read-write, and the value of the variable.

The SNMP manager 20 collects information via MIBs about routers, hubs, bridges, concentrators, servers, switches and other inter-networking devices. When a problem at a remote node is detected, the corresponding SNMP agent issues an alarm that identifies the problem by type and node address. The SNMP manager typically sends a Telnet script to a TCP/IP-addressable enterprise power manager. The Telnet script instructs the enterprise power manager to cycle the power cycle, to recover an otherwise locked-up network device. SNMP management is not required for the enterprise power manger and the associated intelligent power modules. The intelligent power modules include normally closed relays so power is always on except when the relay is deliberately opened to trigger a power on reset and reboot. The network management application monitors the UPS and the inter-networking devices.

The load sensor and power-on sensor can be combined such that a console operator can determine if electrical power is available to an equipment rack and to an individual inter-networking device. A relay reset located between the power source and the client equipment node supports an SNMP-type SET command that can be defined to open and close a relay to power-cycle the inter-networking device. Such power-cycling can clear a lockup condition and allow the device to return to normal operation via its own internal power-up reset mechanism.

A console operator can be notified by conventional means that a router is failing. A determination then needs to be made that the electrical power is available to the equipment rack and to an individual inter-networking device. The next action would be to try to power-cycle an individual inter-networking device to return it to operational status.

A power-on sensor 252, a load sensor 214 and a relay reset 218 can be combined in the electrical power supply connected to the equipment rack. Once a console operator has determined both that the router is failing and that the electrical power is available to the equipment rack and to the individual inter-networking device, the next logical step can be to power-cycle the individual inter-networking device, e.g., to return it to operational status.

Where the in-place equipment that supplies electrical power for an equipment rack cannot be modified to incorporate the functions of an intelligent power module, the intelligent power module 200 can be connected in-line between the electrical power source and the equipment power receptacle. The intelligent power module provides the necessary power-on sensor, load sensor, and relay reset circuit functions. The network management console operator can determine by conventional means that a device such as a router is failing. With the present invention it can be further determined that electrical power is available to an equipment rack and to an individual inter-networking device, and even that the device's power switch is on. The present invention further permits an action to power-cycle the individual inter-networking device, to return it to operational status by forcing a reboot.

A pass-through communication switch is preferably included with power managers 28 that are installed in the same equipment rack with other inter-networking devices because many inter-networking devices have RS-232 network management system ports. Such management ports are intended to permit users to upload new software and to update/inspect configuration tables. A call-pass-through multi-port communications switch allows the initial communications session with modem, RS-232 or TCP/IP, to be switched directly to a device's management port. For example, when a communications session is established to reboot a locked up router, after the router is back in operation, the same communications session can be transferred from the power manager 28 to the router's management port. Preferably, such transfer of the particular communications session can be switched directly from a user interface screen in communication with the SNMP agent 46. The network operator can thereafter continue the repair operation by inspecting or updating the router's configuration table, and to verify its operability.

User interfaces are preferably provided to be configured by a system administrator at the SNMP manager 20. A screen interface allows an operator to control individual intelligent power modules 30, 32, 34, 36, directly from an associated keyboard. A command interface preferably allows script files to be constructed and sent directly for execution. Response codes are returned after each command is executed. Group names are preferably supported which allows a single command to control multiple devices.

The power manager 28 preferably supports a variety of communication interfaces, such as, RS-232 and ETHERNET. Out-of-band communications are connectable through an RS-232 interface using a DB9-type connector on a back panel. Such a port is used to establish communications sessions. An external dial-in-modem can also be used to establish communications. In-band communications are preferably provided with a LAN communications interface that supports ETHERNET connections, e.g., 10BaseT or 10Base2, with both IPX and TCP/IP protocols being supported.

A seven layer network communications model that is universally used to communicate between most types of computer networks is defined by the International Organization of Standards (ISO). Every layer relies on all its lower layers to complete its communication tasks. There are seven layers identified as the application, presentation, session, transport, network, data link, and physical layers. For example, e-mail is a task of the application layer. The application layer uses all of the layers below it to deliver particular e-mail messages to their destinations. The presentation layer formats the look of the e-mail, and the physical layer actually transports the binary data across the network. For more information, see, Naugle, Matthew G., *Local Area Networking*, (McGraw-Hill: New York), 1991.

The information that the SNMP manager 20 can gather from the SNMP agents 22 and 24 around a network is the definition of the MIB and it has a hierarchical tree structure. At the top of the tree is the general network information. Each branch of the tree gets more detailed about a specific network area. The leaves of the tree include the most detail. A device may be a parent in the tree, and its children can be discrete serial and parallel devices. Each node in the MIB tree can be represented by a variable. The top of a local area network MIB tree is usually referred to as "internet".

Managed objects are accessed via the MIB and are defined using a subset of ASN.1. Each object type is named by an object identifier, which is an administratively assigned name. The object type and an object instance uniquely identify a specific object. Descriptor text strings are used to refer to the object type.

Network information is exchanged with protocol data unit (PDU) messages, which are objects that contain variables and have both titles and values. SNMP uses five types of PDUs to monitor a network. Two deal with reading terminal data, two deal with setting terminal data, and one, the trap, is used for monitoring network events such as terminal start-ups or shut-downs. When a user wants to see if a terminal is attached to the network, for example, SNMP is used to send out a read PDU to that terminal. If the terminal is attached, the user receives back a PDU with a value "yes, the terminal is attached". If the terminal was shut off, the user would receive a packet informing them of the shutdown with a trap PDU.

In alternative embodiments of the present invention, it may be advantageous to include the power manager and intelligent power module functions internally as intrinsic components of an uninterruptable power supply (UPS). In applications where it is too late to incorporate such functionally, external plug-in assemblies are preferred such that off-the-shelf UPS systems can be used.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A computer network (10), comprising:
  a host system (12) with a network manager (20) and providing for a TCP/IP communication connection (14) and able to issue read-status (48) and write-control (50) commands;
  at least one remote node (16) with an network agent (22) connected to said TCP/IP communication connection (14) and comprising a plurality of inter-networking devices (38–44) connected to receive operating power from an uninterruptable power supply (UPS) (26);
  a plurality of intelligent power modules (IPM) (30–36) connected between the UPS (26) and said plurality of internetworking devices (38–44), wherein each intelligent power module is connected to and provides at least one of power-on sensing load-sensing, or power cycling on-off for a corresponding internetworking device; and
  a power manager (28) with a network agent (46) connected to said TCP/IP communication connection (14) and each intelligent power module (30–36), and providing for at least one of power-on sensing, load sensing or power cycling on/off of the intelligent power module (30–36) according to receipt of said read-status (48) and write-control (50) commands.

2. The network (10) of claim 1, wherein:
  each of the intelligent power modules (30–36) is connected to the power manager (28) with a serial communications connection (221) supported by a microprocessor (220).

3. The network (10) of claim 1, wherein:
  each of the intelligent power modules (30–36) includes a microprocessor (220) connected by opto-isolator (252) to independently sense the power-on status of said IPM-corresponding internetworking device.

4. The network (10) of claim 3, wherein:
  said microprocessor communicates said power-on status of said IPM-corresponding inter-networking device (38–44) to the network manager (20) through the power manager (28) as a variable in a managed information base (MIB) data construct communicated by said TCP/IP communication connection (14) according to a simple network management protocol (SNMP).

5. The network (10) of claim 1, wherein:
  each of the intelligent power modules (30–36) includes a microprocessor (220) connected by load sensing means (214) to independently sense the load status of said IPM-corresponding inter-networking device (38–44).

6. The network (10) of claim 5, wherein:
  said microprocessor communicates said load status of said IPM-corresponding inter-networking device (38–44) to the network manager (20) through the power manager (28) as a variable in a managed information base (MIB) data construct communicated by said TCP/IP communication connection (14) according to a simple network management protocol (SNMP).

7. The network (10) of claim 1, wherein:
  each of the intelligent power modules (30–36) includes a microprocessor (220) connected by on/off means (242)

to independently control the operating power applied to said IPM-corresponding internetworking device.

8. The network (10) of claim 7, wherein:

said microprocessor controls said operating power applied to said IPM-corresponding inter-networking device (38-44) to the network manager (20) through the power manager (28) in response to a variable in a managed information base (MIB) data construct communicated by said TCP/IP communication connection (14) according to a simple network management protocol (SNMP).

9. The network (10) of claim 1, wherein:

each of the intelligent power modules (30-36) includes a microprocessor (220) connected by voltage sensing means (252) to independently sense the power-on status of each of said plurality of inter-networking devices (38-44), and connected by load sensing means (214) to independently sense the load status of each of said plurality of inter-networking devices (38-44), and connected by on/off means (242) to independently control the operating power applied to said IPM-corresponding internetworking device.

10. The network (10) of claim 1, wherein each of the intelligent power modules (30-36) comprises:

means (212-218) for applying a series of alternating current (AC) voltage pulses synchronized to a source of AC power to plurality of inter-networking devices (38-44) with an on/off switch (223);

means (214) for sensing the presence of a series of AC current pulses that result if said device switch is closed;

means (220) for analyzing any AC current pulses detected by the sensing means (214) to determine if they resulted from an application of the AC voltage by the applying means (212-218); and means (220, 221) for outputting an on/off status indication for said switch (223).

11. The network (10) of claim 1, wherein each of the intelligent power modules (30-36) comprises:

terminals (236-240) for connection to the power inputs (230-234) of said inter-networking devices (38-44) with a power switch (223);

synchronized pulse generation means (212) connected to the terminals for applying an alternating pulsed voltage synchronized to an incoming alternating current power source to said inter-networking devices (38-44);

current sensing means (214) connected in series with said terminals (236-240) and the synchronized pulse generation means (212); and analysis means (220) connected to both the synchronized pulse generation means (212) and the current sensing means (214) for determining if a current sensed with the current sensing means resulted from both said switch (223) being closed and the application of said alternating pulsed voltage from the synchronized pulse generation means (212).

12. The network (10) of claim 11, wherein each of the intelligent power modules (30-36) comprises:

the terminals (236-240) comprise hot, neutral and ground connections to the power inputs of said inter-networking devices (38-44);

the synchronized pulse generation means (212) includes a clock generator with an output to coincide with each zero-crossing of said incoming AC power input;

the current sensing means (214) comprises an opto-isolator (248) and a sense resistor (244); and the analysis means (220) comprises a microprocessor with a data input (I_SENS) connected to said opto-isolator and a data output (EACG) connected to control the synchronized pulse generation means.

* * * * *

US005949974C1

(12) EX PARTE REEXAMINATION CERTIFICATE (4899th)
United States Patent
Ewing et al.

(10) Number: US 5,949,974 C1
(45) Certificate Issued: Jan. 27, 2004

(54) SYSTEM FOR READING THE STATUS AND FOR CONTROLLING THE POWER SUPPLIES OF APPLIANCES CONNECTED TO COMPUTER NETWORKS

(75) Inventors: Carrell W. Ewing, Palo Alto, CA (US); Andrew J. Cleveland, San Martin, CA (US)

(73) Assignee: Server Technology, Inc, Reno, NV (US)

Reexamination Request:
No. 90/006,097, Aug. 27, 2001

Reexamination Certificate for:
Patent No.: 5,949,974
Issued: Sep. 7, 1999
Appl. No.: 08/685,436
Filed: Jul. 23, 1996

(51) Int. Cl.[7] ........................ G06F 15/16; G06F 15/173; G06F 1/26
(52) U.S. Cl. ........................ 709/202; 709/223; 713/340
(58) Field of Search .................... 713/300, 310, 713/330, 340; 307/96, 64, 66, 85 T, 86; 391/88, 90, 91.1

(56) References Cited

U.S. PATENT DOCUMENTS

| | | |
|---|---|---|
| 4,051,326 A | 9/1977 | Badagnani et al. |
| 4,206,444 A | 6/1980 | Ferlan |
| 4,356,545 A | 10/1982 | West |
| 4,442,319 A | 4/1984 | Treidl |
| 4,611,289 A | 9/1986 | Coppola |
| 4,647,721 A | 3/1987 | Busam et al. |
| 4,701,946 A | 10/1987 | Oliva et al. |
| 5,198,806 A | 3/1993 | Lord |
| 5,319,571 A | 6/1994 | Langer et al. |
| 5,410,713 A | 4/1995 | White et al. |
| 5,506,573 A | 4/1996 | Ewing et al. |
| 5,596,628 A | 1/1997 | Klein |
| 5,717,934 A | 2/1998 | Pitt et al. |
| 5,862,391 A | 1/1999 | Salas et al. |

FOREIGN PATENT DOCUMENTS

WO   WO 93/10615   5/1993

OTHER PUBLICATIONS

Sentry Ambassador Remote Power Manager © 1996.
Sentry R–2000 Remote Power Manager © 2001.
Sentry 110/230 VAC Product Family © 2000.
Sentry Power Manager –48 VDC Product Family © 2000.
Distributed Power Module Product List, Sep. 23, 2002.
Sentry Power Modules © 1999.
Sentry Power Tower Products © 2001/2002.
Sentry Expanded Function Power Tower (PTEF) © 2001/2002.
Sentry Serial Power Tower (PTSS) © 2001/2002.
Sentry Power Tower Power Distribution © 2001/2002.
Sentry Commander R–400 Remote Power Mgr. © 2001/2002.
Sentry Commander R–400 Remote Pwr.Mgr.datasheet © 1999.
Sentry Administrator R–450 © 2001/2002.
Sentry Administrator R–450 Remote Pwr.Mgr. © 1998.
Remote Power On/Off, Installation and Operations Manual, c. 1991.

(List continued on next page.)

Primary Examiner—Meng-Al T. An

(57) ABSTRACT

A SNMP network comprises a power manager with a SNMP agent in TCP/IP communication over a network with a SNMP network manager. The power manager is connected to control several intelligent power modules each able to independently control the on/off power to several inter-networking devices in an equipment rack at a common remote node, e.g., a point-of-presence site. Power-on and load sensors within each intelligent power module are able to report the power status of each inter-networking device to the SNMP network manager with MIB variables in response to GET commands. The SNMP network manager is further able to reboot each inter-networking device by cycling the power on/off to its respective intelligent power module with the SET command provided in conventional SNMP management applications.

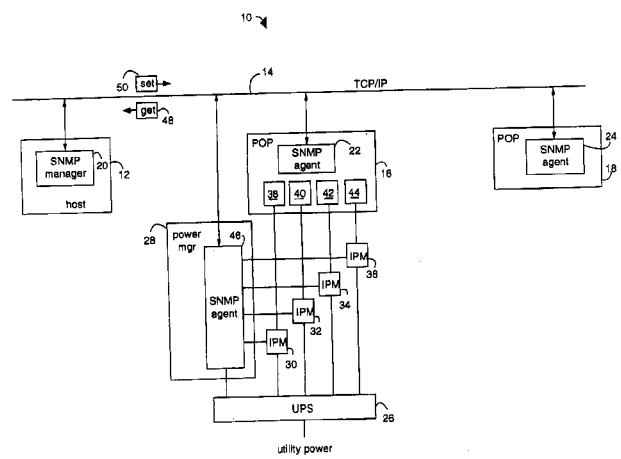

OTHER PUBLICATIONS

Sentry Remote Power Manager brochure,c. 1991.
Power–On product wrapper,c. 1991.
Remote Power On/Off product wrapper,cv. 1991.
Intelligent Power Module,c. 1991.
Local and Remote Power On/Off Alternatives,c. 1991.
NEW BOX Specification, dated Mar. 6, 1991.
RPM–15 Power Module Specification, Mar. 18, 1991.
Sentry Remote Power Manager, Operational Instructions, Sep. 24, 1992.
"Keeping Up With . . . ", INTERNET TELEPHONY, Mar. 2000, pp. 84–87.
"Rebooting Across the Net", PC Magazine, May 5, 1998.
"APC MasterSwitch", PC Magazine, May 5, 1998.
"Server Technology Sentry R–2000", PC Magazine, May 5, 1998.
American Power Conversion, "Call–UPS™", 1991, #996–0070, APC, West Kingston RI 02892USA.
American Power Conversion, "Measure–UPS™", Mar. 1993, #996–0127, APC, West Kingston RI 02892USA.
American Power Conversion, "Introducing the UPS to build your business on . . . ", Oct. 1993, #996–0207–A, APC, West Kingston, RI 02892USA.
American Power Conversion, "Application Note #A2", Oct. 1993, APC, West Kingston, RI 02892USA.
American Power Conversion, "Application Note #A6", Oct. 1993, APC, West Kingston, RI 02892USA.
American Power Conversion, "Internetworking Power Protection", Jan. 1994, #996–0295, APC, West Kingston, RI 02892USA.
American Power Conversion, "PowerNet™ SNMP Adapter", Jan. 1994, #996–0126, APC, West Kingston, RI 02892USA.
American Power Conversion, "Solutions '94", Feb. 1994, #996–0131, APC, West Kingston, RI 02892USA.
American Power Conversion, "APC NetShelter", 1995, #996–0643–A, APC, West Kingston, RI 02892USA.
American Power Conversion, "PowerNet", Sep. 1995, #996–0325–b, APC, West Kingston, RI 02892USA.
American Power Conversion, "APC Smart–UPS RM", 1996, #996–0618–B, APC, West Kingston, RI 02892USA.
American Power Conversion, "APC Smart–UPS XL", 1996, #996–0630–B, APC, West Kingston, RI 02892USA.
American Power Conversion, "Smart–UPS", 1996, #996–0386–E, APC, West Kingston, RI 02892USA.
American Power Conversion, "PowerChute plus", 1996, #996–00041–C, APC, West Kingston, RI 02892USA.
American Power Conversion, "Internetworking Power Protection", 1996, #996–0295–B, APC, West Kingston, RI 02892USA.
American Power Conversion, "UPS Accessories", 1996, #996–0411–C, APC, West Kingston, RI 02892USA.
American Power Conversion, "Application Notes", Oct. 1996, #996–0495–C, APC, West Kingston, RI 02892USA.
American Power Conversion, "PowerNet®", 1998, #996–0325D, APC, West Kingston, RI 02892USA.
B. Ewing and J. Mallory, "Power–ON/OFF–Product Information", 1990, Server Technology, Inc., Reno, Nevada.
Raphael Needleman, "Power–ON/OFF Lets You Turn on Remote PCs by Phone", Feb. 1991, Info World Impressions, V. 13, Issue 5.
Server Technology, Inc., "Any–To–Any Matrix Communications Switch", 1996, Server Technology, Inc., Reno, Nevada.
Server Technology, Inc., "Sentry Ambassador", 1996, Server Technology, Inc., Reno, Nevada.
Server Technology, Inc., "LAN, WAN, Enterprise, Internet Access Equipment", 1996, Server Technology, Inc., Reno, Nevada.
Server Technology, Inc., "SENTRYRACK", 1996, Server Technology, Inc., Reno, Nevada.
Server Technology, Inc., "SENTRYINTERNATIONAL", 1996, Server Technology, Inc., Reno, Nevada.
Server Technology, Inc., "SENTRY Communications and User Interface", 1996, Server Technology, Inc., Reno, Nevada.
Server Technology, Inc., "SENTRYSHELF", 1996, Server Technology, Inc., Reno, Nevada.
Server Technology, Inc., "SENTRY Power Modules", 1996, Server Technology, Inc., Reno, Nevada.
Server Technology, Inc., "SENTRY R–2000 Remote Power Manager", 1999, Server Technology, Inc., Reno, Nevada.
Server Technology, Inc., "MasterSwitch™", 1996, Server Technology, Inc., Reno, Nevada.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 7 and 9 are cancelled.

Claims 1, 6, 8 and 12 are determined to be patentable as amended.

Claims 2–4 and 10–11, dependent on an amended claim, are determined to be patentable.

1. A computer network (10), comprising:
    a host system (12) with a network manager (20) and providing for a TCP/IP communication connection (14) and able to issue read-status (48) and write-control (50) commands;
    at least one remote node (16) with an network agent (22) connected to said TCP/IP communication connection (14) and comprising a plurality of inter-networking devices (38–44) connected to receive operating power from an uninterruptable power supply (UPS) (26);
    a plurality of intelligent power modules (IPM) (30–36) connected between the UPS (26) and said plurality of internetworking devices (38–44), wherein each *of the* intelligent power [module is connected to and provides at least one of power-on sensing load-sensing, or power cycling on-off for a corresponding internetworking device] *modules (30–36) includes a microprocessor (220) connected by voltage sensing means (252) to independently sense the power-on status of each of said plurality of inter-networking devices (38–44), and connected by load sensing means (214) to independently sense the load status of each of said plurality of* inter-networking devices (*38–44*)*, and connected by power on/off means (242) to independently control the operating power applied to said IPM corresponding internetworking device*; and
    a power manager (28) with a network agent (46) connected to said TCP/IP communication connection (14) and each intelligent power module (30–36), and providing for [at least one of] power-on sensing, load sensing or power [cycling] on/off [of] *by* the intelligent power module (30–36) according to receipt of said read-status (48) and write-control (50) commands.

6. The network (10) of claim [5] *1*, wherein:
    said microprocessor communicates said load status of said IPM-corresponding inter-networking device (38–44) to the network manager (20) through the power manager (28) as a variable in a managed information base (MIB) data construct communicated by said TCP/IP communication connection (14) according to a simple network management protocol (SNMP).

8. The network (10) of claim [7] *1*, wherein:
    said microprocessor controls said operating power applied to said IPM-corresponding inter-networking device (38–44) to the network manager (20) through the power manager (28) in response to a variable in a managed information base (MIB) data construct communicated by said TCP/IP communication connection (14) according to a simple network management protocol (SNMP).

12. The network (10) of claim 11, wherein *for* each of the intelligent power modules (30–36) [comprises]:
    the terminals (236–240) comprise hot, neutral and ground connections to the power inputs of said inter-networking devices (38–44);
    the synchronized pulse generation means (212) includes a clock generator with an output to coincide with each zero-crossing of said incoming AC power input;
    the current sensing means (214) comprises an opto-isolator (248) and a sense resistor (244); and
    the analysis means (220) comprises a microprocessor with a data input (I_SENS) connected to said opto-isolator and a data output (EACG) connected to control the synchronized pulse generation means.

* * * * *